United States Patent
Fingerman et al.

(10) Patent No.: US 9,127,759 B2
(45) Date of Patent: Sep. 8, 2015

(54) THRUST WASHER AND TORQUE CONVERTER CONTAINING THE SAME

(71) Applicants: Michael Fingerman, West Bloomfield, MI (US); Daljit Singh, Sterling Heights, MI (US); Tomasz K Kietlinski, Grosse Pointe, MI (US); John G Rasico, Lake Orion, MI (US); Prashant Modi, Auburn Hills, MI (US); Marvin G Schiemann, Broomfield Hills, MI (US); Willem S Haven, Clarkston, MI (US)

(72) Inventors: Michael Fingerman, West Bloomfield, MI (US); Daljit Singh, Sterling Heights, MI (US); Tomasz K Kietlinski, Grosse Pointe, MI (US); John G Rasico, Lake Orion, MI (US); Prashant Modi, Auburn Hills, MI (US); Marvin G Schiemann, Broomfield Hills, MI (US); Willem S Haven, Clarkston, MI (US)

(73) Assignee: FCA US LLC, Auburn Hills, MI (US)

( * ) Notice: Subject to any disclaimer, the term of this patent is extended or adjusted under 35 U.S.C. 154(b) by 408 days.

(21) Appl. No.: 13/680,591

(22) Filed: Nov. 19, 2012

(65) Prior Publication Data
US 2014/0137546 A1    May 22, 2014

(51) Int. Cl.
*F16H 41/24*    (2006.01)
*F16H 45/02*    (2006.01)

(52) U.S. Cl.
CPC ........ *F16H 41/24* (2013.01); *F16H 2045/0205* (2013.01)

(58) Field of Classification Search
CPC .......... F16D 33/00; F16D 33/18; F16H 41/24
USPC .......................................................... 60/330
See application file for complete search history.

(56) References Cited

U.S. PATENT DOCUMENTS

| | | | |
|---|---|---|---|
| 5,005,356 A | 4/1991 | Saunders | |
| 5,168,702 A * | 12/1992 | Sakakibara et al. | 60/345 |
| 5,918,461 A * | 7/1999 | Bacon | 60/343 |
| 6,502,994 B2 | 1/2003 | Jackson | |
| 7,080,720 B1 | 7/2006 | Yarborough et al. | |
| 7,565,958 B1 * | 7/2009 | Dumas | 192/3.29 |
| 7,621,122 B2 | 11/2009 | Marathe et al. | |
| 7,887,240 B2 | 2/2011 | Marathe et al. | |
| 7,891,179 B2 * | 2/2011 | Parks | 60/364 |
| 7,937,937 B2 * | 5/2011 | Wolf et al. | 60/330 |
| 7,938,243 B2 * | 5/2011 | Avins et al. | 192/204 |
| 2004/0172936 A1 * | 9/2004 | Mueller et al. | 60/330 |
| 2007/0029151 A1 | 2/2007 | Avins et al. | |
| 2007/0144161 A1 | 6/2007 | Marathe et al. | |
| 2008/0308373 A1 | 12/2008 | Wiegert | |
| 2009/0205916 A1 | 8/2009 | Peri | |
| 2009/0238505 A1 | 9/2009 | Jameson | |
| 2009/0241533 A1 | 10/2009 | Marathe | |
| 2001/0123349 | 5/2011 | Marathe | |

FOREIGN PATENT DOCUMENTS

JP    2004308855 A    11/2004

OTHER PUBLICATIONS

International Search Report and Written Opinion dated Feb. 11, 2014 for International Application No. PCT/US2013/070479, International Filing Date Nov. 18, 2013.

* cited by examiner

*Primary Examiner* — Thomas E Lazo
(74) *Attorney, Agent, or Firm* — Ralph E. Smith (57) ABSTRACT

A thrust washer for a torque converter, the thrust washer having a curved front surface with a plurality of grooves for increasing fluid flow between the inner diameter and the outer diameter of the thrust washer. This increased fluid flow reduces the buildup of back pressure within the torque converter enabling better operation thereof.

14 Claims, 9 Drawing Sheets

THRUST WASHER AND TORQUE CONVERTER CONTAINING THE SAME

FIELD OF THE INVENTION

The present disclosure relates to a thrust washer for a torque converter, and more particularly, to a thrust washer designed to maximize fluid flow and reduce the buildup of back pressure within a torque converter.

BACKGROUND OF THE INVENTION

A torque converter is a fluid-filed assembly typically used in automatic and power-shift transmissions. A torque converter uses fluid to transmit energy from an input, typically an engine, to an output, typically a transmission, and consists of three main components: a turbine, an impeller, and a stator. During the operation of a torque converter, torque generated from the engine drives the impeller. A cover is attached to the impeller so both the cover and impeller rotate at the same speed as the engine. The turbine is connected to an output shaft, and the stator is connected to a non-rotating support shaft. The turbine and impeller have a plurality of blades oriented so that as the impeller rotates, the fluid within the impeller is forced into the blades of the turbine, transmitting energy to the turbine, and forcing it to rotate. The stator has a plurality of blades oriented to direct the fluid leaving the turbine to flow in the direction of the impeller's rotation rather than in a direction opposing the impeller's rotation.

A thrust washer is a component used within many torque converters to ensure the proper location of the torque converter's component parts, and is typically located between the impeller and the cover. It is desirable to route fluid through the torque converter to ensure proper functioning. One of the fluid pathways within a torque converter can be around or through the thrust washer.

A typical thrust washer contains a multitude of straight grooves on the surface to allow for fluid communication within the torque converter. This design can provide adequate fluid flow at times when the velocity of the fluid is not at its maximum. However, once the velocity of the fluid reaches a certain level, a significant buildup of back pressure may be generated within the torque converter due to a failure of the fluid to pass at an adequate rate between the outer diameter and the inner diameter of the thrust washer. This buildup of back pressure can lead to decreased performance and possible failure of the torque converter. Accordingly, there is a need for improvement in the art.

SUMMARY OF THE INVENTION

The present disclosure provides a thrust washer designed to allow superior fluid flow within a torque converter. The thrust washer of the present invention contains a least one groove in its front surface to allow for fluid communication between the inner diameter and the outer diameter of the thrust washer. The front surface of the thrust washer is curved such that the thickness of the thrust washer at the inner diameter is greater then the thickness of the thrust washer at the outer diameter. This design increases the length of the at least one groove, allowing for a greater reduction in the velocity of the fluid traveling through the groove which, in turn, lessens fluid turbulence and increases the flow rate. The increased flow rate alleviates the buildup of back pressure.

In one embodiment of the present invention, the thrust washer includes at least one groove having a width that is greater at the outer diameter of the thrust washer than at a point proximal to the inner diameter of the thrust washer. This creates a wider entry area to further increase the fluid flow rate within the torque converter.

In another embodiment of the present invention, the at least one groove has one side that is substantially straight, and one side that is curved along at least part of a length thereof such that the groove is wider at the outer diameter of the thrust washer than at a point proximal to the inner diameter of the thrust washer.

In yet another embodiment of the present invention, the at least one groove has both sides that are curved along at least part of their length such that the geometry of the curve of the first side in relation to the curve of the second side creates a groove that is wider at the outer diameter of the thrust washer than at a point proximal to the inner diameter of the thrust washer.

In yet another embodiment of the present invention, the at least one groove extends completely from the outer diameter to the inner diameter.

In yet another embodiment of the present invention, the thrust washer includes a plurality of grooves arranged radially about the front surface of the thrust washer, and the thrust washer also includes at least one protrusion extending outward from the front surface in proximity to the inner diameter, and between each of the plurality of grooves.

In yet another embodiment of the present invention, the torque converter contains non-ruled impeller blades and turbine blades usable with the thrust washer of the present invention. In comparison to traditional blade designs that utilize ruled blade surfaces, non-ruled blades serve to increase the flow rate of the fluid through the channels created by adjacent blades, and therefore further decrease fluid losses within the torque converter.

Further areas of applicability of the present disclosure will become apparent from the detailed description provided hereinafter. It should be understood that the detailed description, including disclosed embodiments and drawings, are mere exemplary in nature intended for purposes of illustration only and are not intended to limit the scope of the invention, its application or use. Thus, variations that do not depart from the gist of the invention are intended to be within the scope of the invention.

DESCRIPTION OF THE INVENTION

Figure 1:
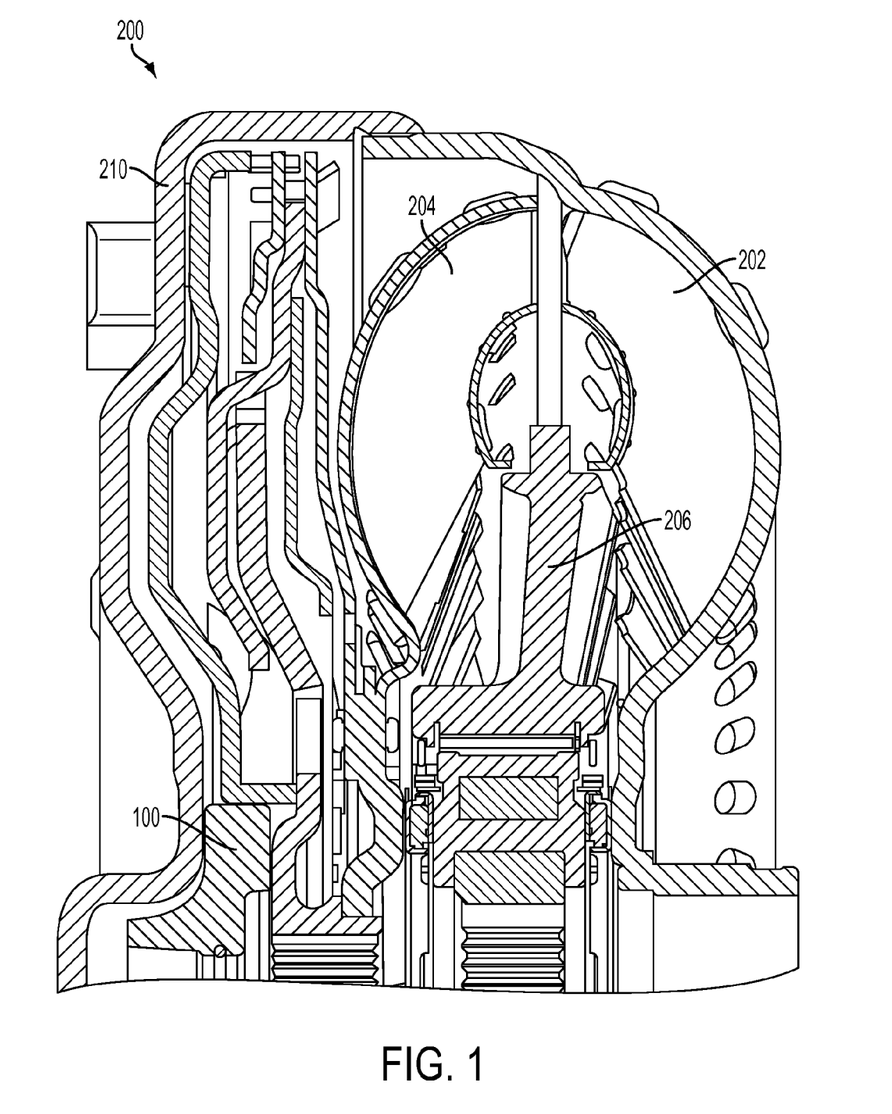
FIG. 1 is a cross sectional view of a thrust washer in a torque converter according to an embodiment of the present invention.

FIG. 1 is a cross sectional view of a torque converter 200 showing the location of a thrust washer 100, impeller 202, turbine 204, stator 206, and cover 210. Embodiments of a thrust washer contemplated herein provide more desirable fluid flow within the torque converter. During operation of the torque converter 200, torque generated from the engine (not shown) drives the impeller 202. The cover 210 is attached to the impeller 202, so both the cover 210 and the impeller 202 rotate at the same speed as the engine. The turbine 204 is connected to the output shaft (not shown), which, when used in an automotive application, is the input shaft of a transmission (not shown). The turbine 204 and the impeller 202 have a plurality of blades oriented so that as the impeller 202 rotates, the fluid within the torque converter 200 is forced into the blades of the turbine 204, transmitting energy to the turbine 204 and forcing it to rotate.

Figure 2:
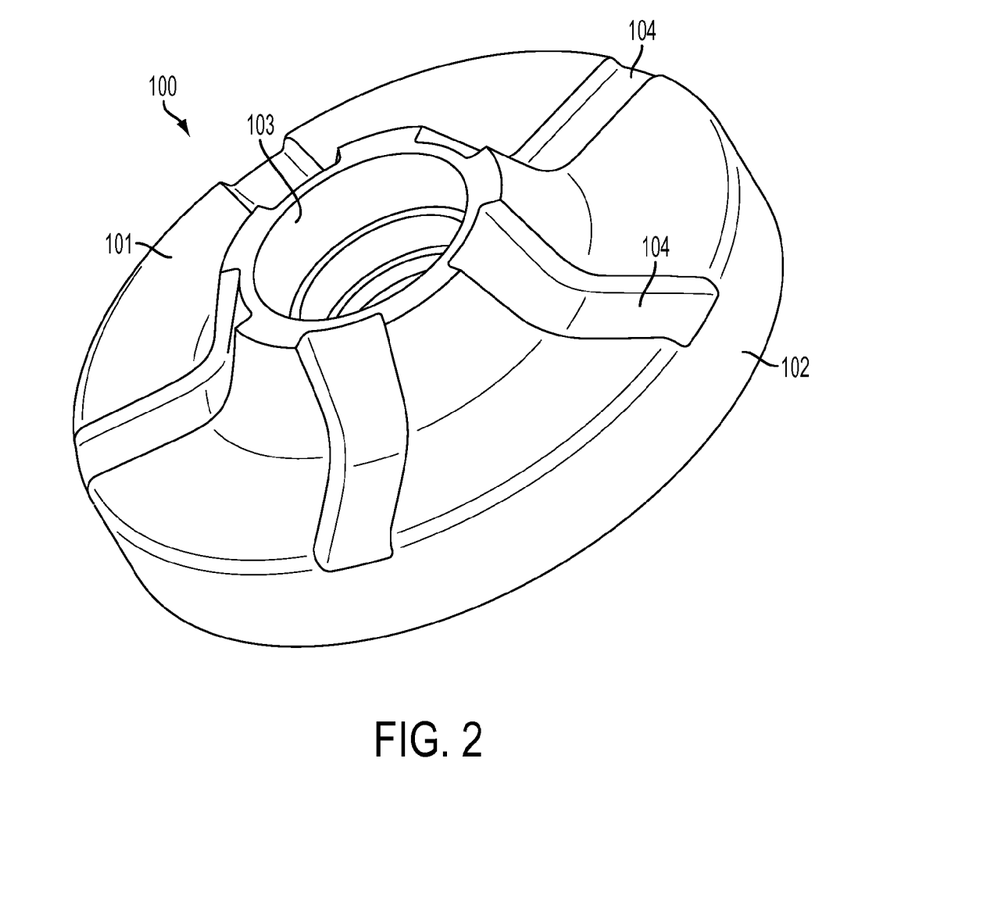
FIG. 2 is a perspective view of a thrust washer according to an embodiment of the present invention.
Figure 3:
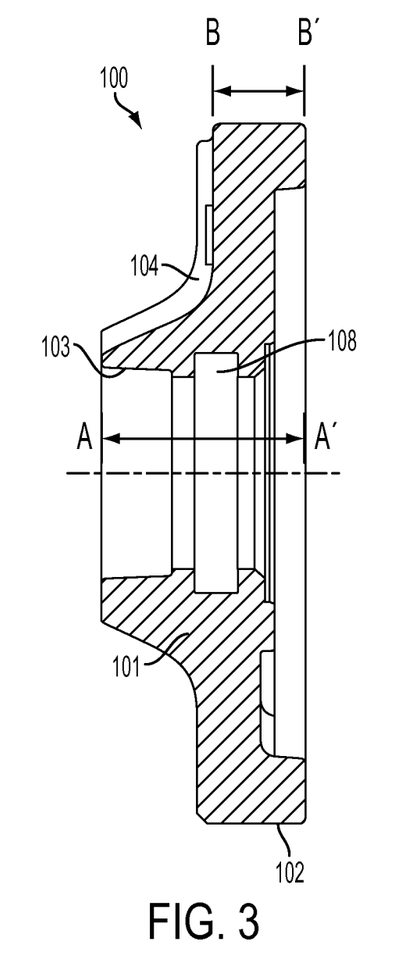
FIG. 3 is a side view of the thrust washer of FIG. 2.

FIGS. 2 and 3 show the thrust washer 100 according to a present embodiment. The thrust washer is positioned in the torque converter between the cover 210 and the turbine 204. The thrust washer 100 has an annular body 101 with an outer diameter 102 and an inner diameter 103. The exemplary thrust washer 100 depicted has a front surface that is curved such that a thickness of the thrust washer 100 is greater at the inner diameter 103 than at the outer diameter 102. The thrust washer 100 has at least one curved groove 104 located in the front surface of the thrust washer 100. The groove 104 extends along the curved front surface from the outer diameter 102 towards the inner diameter 103. The groove 104 follows the curved contour of the front surface of the thrust washer 100 and allows for fluid communication between the inner diameter 103 and the outer diameter 102 when the thrust washer 100 is installed in a torque converter. The exemplary embodiment shown in FIG. 2 depicts a plurality of spaced apart grooves. The groove(s) route fluid through the torque converter. In one torque converter operating (lock-up) mode, fluid is routed through the groove in a direction from the outer diameter 102 of the thrust washer toward the inner diameter 103. In another torque converter operating (open converter/cooling) mode, fluid is routed through the groove in a direction from the inner diameter 103 of the thrust washer toward the outer diameter 102. This design increases the length of groove 104, allowing for a greater reduction in the velocity of the fluid traveling through groove 104 which, in turn, lessens fluid turbulence and increases the flow rate. The increased flow rate alleviates the buildup of back pressure.

As shown in FIG. 3, the thrust washer inner diameter thickness (A-A') is greater than the thrust washer outer diameter thickness (B-B'). As further shown in FIG. 3, the inner diameter 103 has a cavity 108 therein configured to connect with the output shaft (not shown). As one of skill in the art would readily understand, the inner diameter cavity can have many different configurations dependant upon the corresponding configuration of the output shaft.

Figure 4:
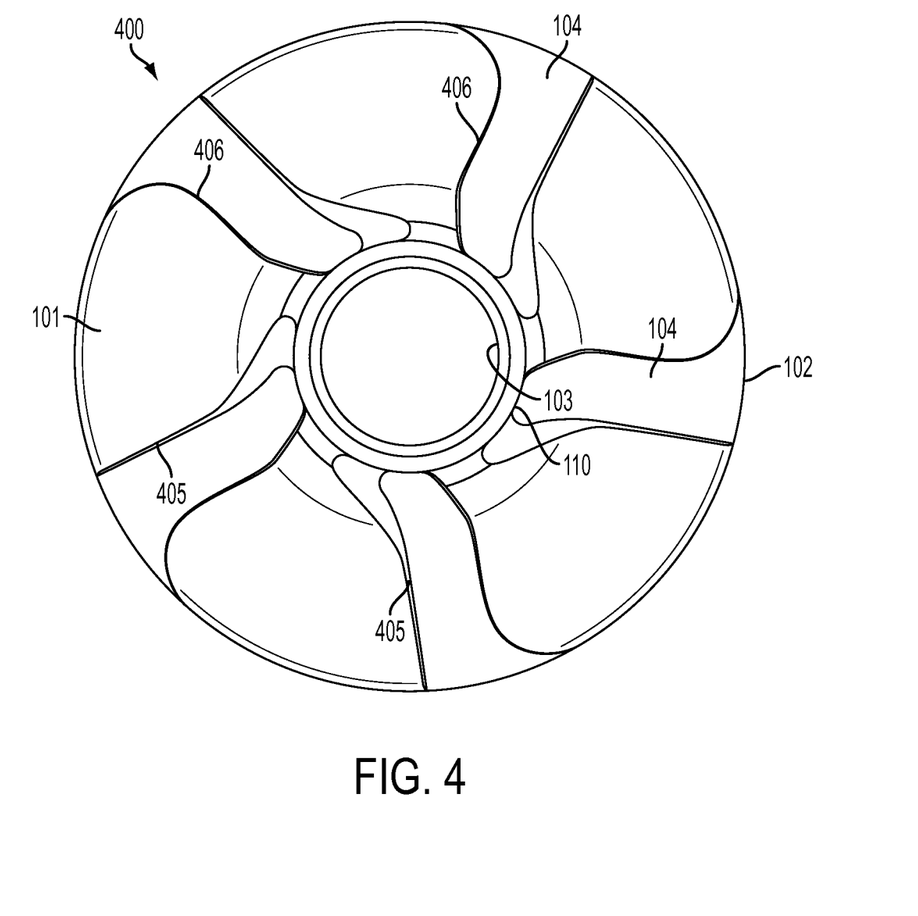
FIG. 4 is a front view of a second embodiment of a thrust washer according to the present invention.

FIG. 4 is a front view of a second embodiment of a thrust washer 400 according to the present invention. In this embodiment, the grooves 104 have a width that is wider at the outer diameter 102 than at a point proximal 110 to the inner diameter 103 of the thrust washer 400. In FIG. 4, like or corresponding parts are indicated by like reference numerals as used in FIGS. 2 and 3 and the repeated explanations thereof are omitted. In this second embodiment, the grooves 104 have a first side 405 that is substantially straight at the entry area of the groove 104, and a second side 406 that is curved along at least a portion of a length thereof. The curvature of the second side 406 creates a groove 104 that is wider at the outer diameter 102 than at a point proximal 110 to the inner diameter 103 of the thrust washer 400. This creates a wider entry area to further increase the fluid flow rate within the torque converter.

Meanwhile, in all of the drawings attached to this specification, like or corresponding parts are indicated by like reference numerals and the repeated explanations thereof are omitted herein.

Figure 5:
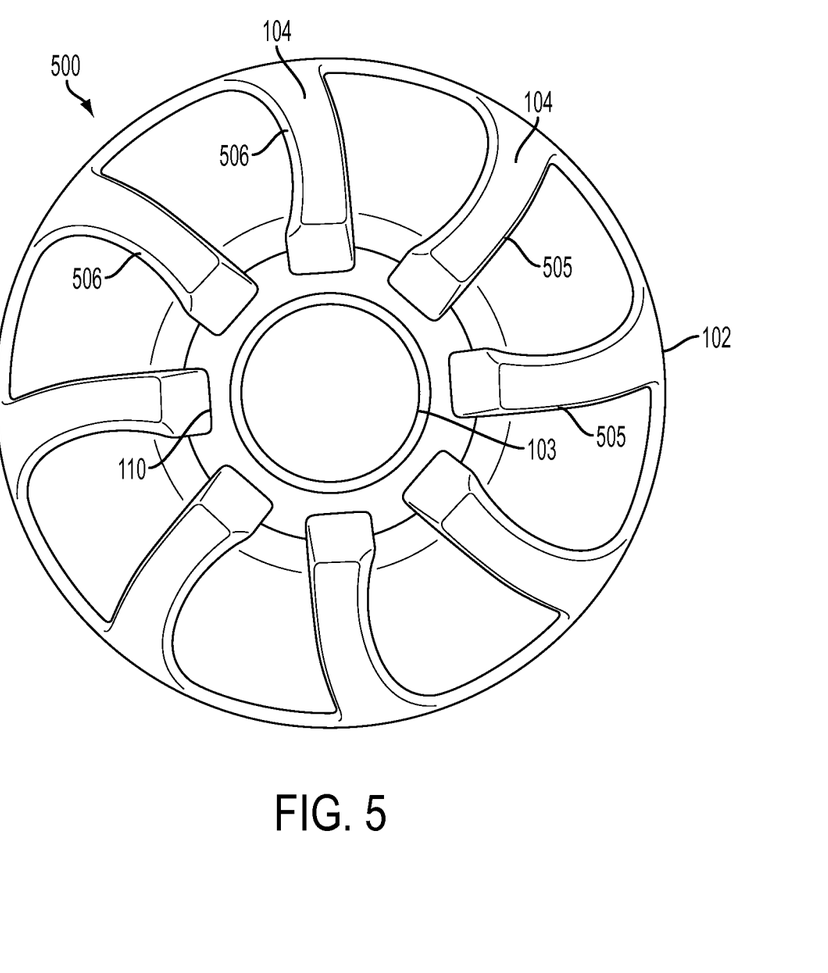
FIG. 5 is a front view of a third embodiment of a thrust washer according to the present invention.

FIG. 5 is a front view of a third embodiment of the thrust washer 500 of the present invention. In this third embodiment, the grooves 104 have both sides curved along at least part of their length. The geometry of the curve of the first side 505 in relation to the curve of the second side 506 creates a groove 104 that is wider at the outer diameter 102 than at a point proximal 110 to the inner diameter 103 of the thrust washer 500. This creates a wider entry area that increases the fluid flow rate within the torque converter.

Figure 6:
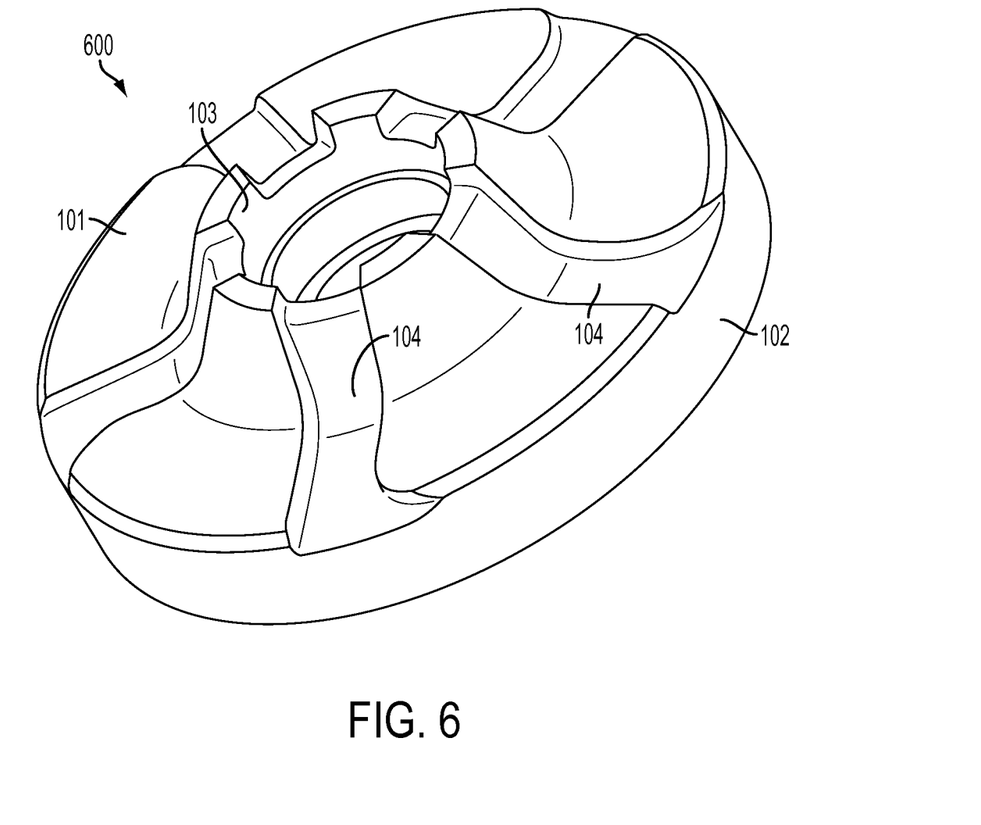
FIG. 6 is a perspective view of a fourth embodiment of a thrust washer according to the present invention.

FIG. 6 is a perspective view of a fourth embodiment of a thrust washer 600 according to the present invention. In this fourth embodiment, the grooves 104 extend completely from the outer diameter 102 to the inner diameter 103 of the thrust washer 600. This design allows for the fluid to pass through the groove 104 at a higher rate, further reducing the buildup of backpressure with the torque converter.

Figure 7:
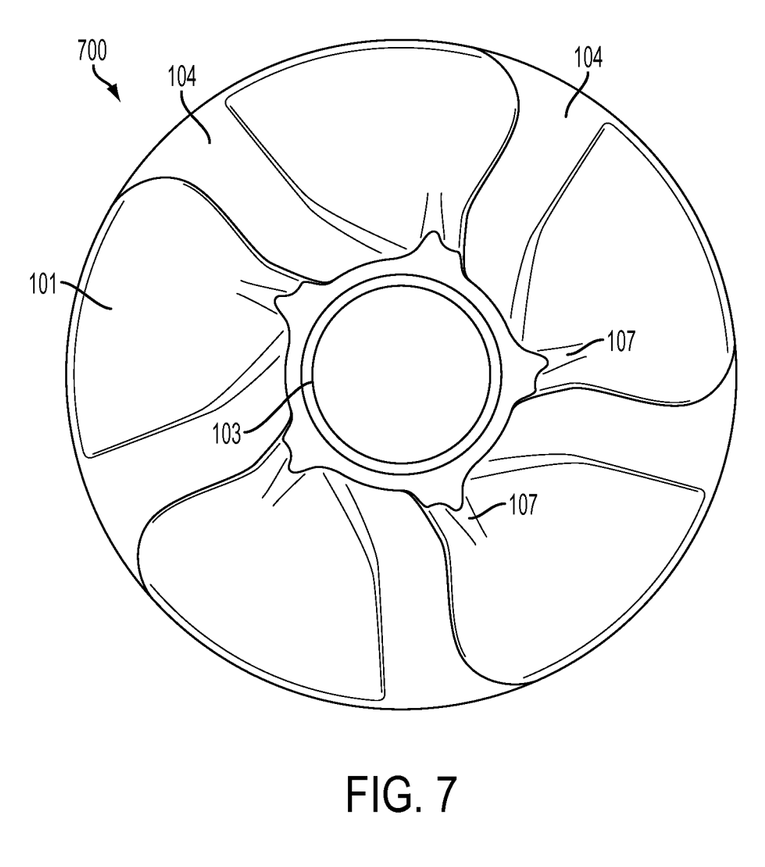
FIG. 7 is a front view of a fifth embodiment of a thrust washer according to the present invention.

FIG. 7 is a front view of a fifth embodiment of a thrust washer 700 according to the present invention. In this fifth embodiment, the thrust washer 700 further includes protrusions 107 extending outward from the front surface of the thrust washer 700. The protrusions 107 are located between adjacent grooves 104 and in proximity to the inner diameter 103 of the thrust washer 700. The protrusions 107 influence the direction of the fluid within the space between the thrust washer 700 and the cover of the torque converter and therefore further assist in increasing the fluid flow rate within the torque converter.

The thrust washer 100 is fabricated from a solid material such as a phenolic, plastic, polyimide resin, or metal. The overall dimensions of the thrust washer 100, including the size of the inner diameter 103, outer diameter 102, and the thickness of the annular body 101, are not limited except so as to allow for the proper positioning and functioning of the component parts of the torque converter. Furthermore, the depth, width, and quantity of the grooves 104 are not limited and can be selected in any number to allow for an adequate fluid flow rate between the inner diameter 103 and the outer diameter 102 of the thrust washer 100 for desired functioning of the torque converter.

In a traditional torque converter, the turbine and impeller are each made up of a plurality of blades having ruled surfaces (or a surface generated by a straight line). As fluid travels through the channels created by these blades, fluid losses are generated when the fluid flow becomes turbulent. Fluid losses lead to overall performance deterioration and decreased torque converter efficiency.

Figure 8:
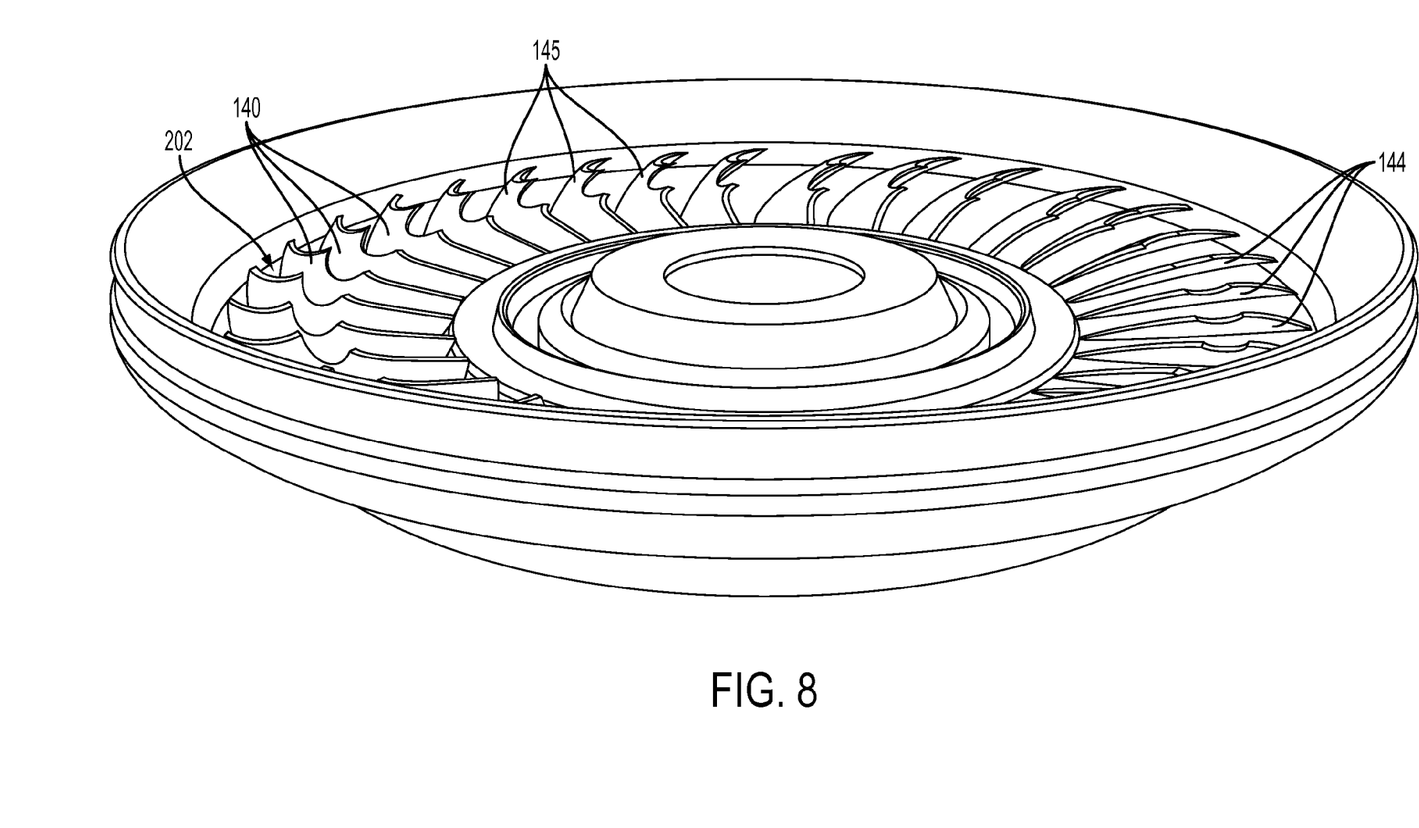
FIG. 8 is a perspective view of an impeller according to an embodiment of the present invention.

FIG. 8 shows an embodiment of an impeller 202 usable with the thrust washer of the present invention. The impeller 202 has a plurality of impeller blades 140 having a non-ruled surface. In particular, impeller blades 140 are contoured such that each impeller blade 140 has a non-ruled front impeller blade surface 144 (blade pressure side) and a non-ruled rear impeller blade surface 145 (blade suction side). These non-ruled surfaces serve to further increase the flow rate of the fluid through the channels created by adjacent impeller blades 140. These non-ruled impeller blade surfaces decrease fluid separation from the impeller blade surfaces thus decreasing fluid turbulence and further increasing torque converter efficiency.

Figure 9:
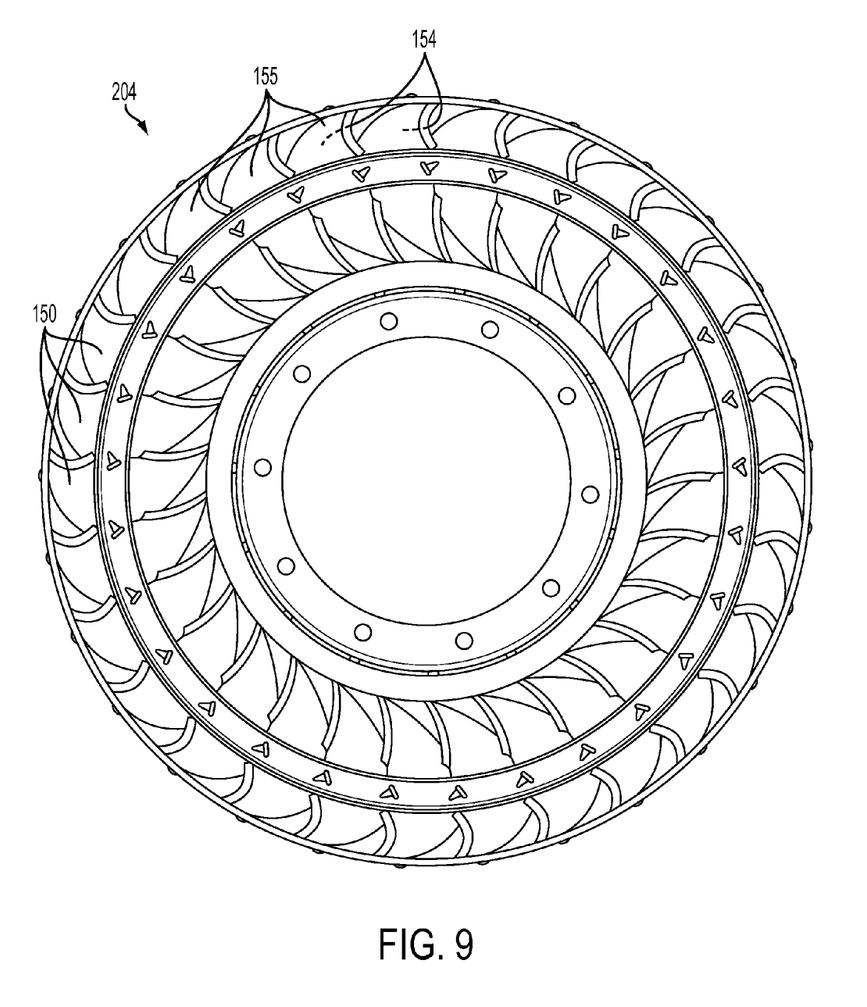
FIG. 9 is a top view of a turbine according to an embodiment of the present invention.

FIG. 9 shows an embodiment of a turbine 204 usable with the thrust washer of the present invention. The turbine 204 has a plurality of turbine blades 150 having a non-ruled surface. In particular, turbine blades 150 are contoured such that each turbine blade 150 has a non-ruled front turbine blade surface 154 and a non-ruled rear turbine blade surface 155. These non-ruled turbine blade surfaces serve to further increase the flow rate of the fluid through the channels created by adjacent turbine blades 150, and therefore further decrease fluid losses within the torque converter 100. These non-ruled turbine blade surfaces decrease fluid separation from the turbine blade surfaces thus decreasing fluid turbulence and further increasing torque converter efficiency.

It is contemplated that an improved torque converter is provided having an embodiment of the thrust washer disclosed herein. Further the torque converter can include a non-ruled impeller and/or a turbine with non-ruled blades to further improve fluid flow. Of course other combinations of the above torque converter components can be utilized to provide a desirable configuration and performance. Embodiments of the invention disclosed herein provide a torque converter with increased fluid flow capability and otherwise improved fluid flow properties such as reduced back pressure and increased torque converter efficiency.

What is claimed is:

1. A thrust washer for a torque converter, the thrust washer comprising:
    an annular body having a curved front surface, an inner diameter, and an outer diameter;
    a plurality of grooves extending along the curved front surface and arranged radially along the front surface, extending from the outer diameter towards the inner diameter, the grooves having a first side, a second side opposite the first side, and a width; and
    a plurality of protrusions extending outward from the front surface and located between adjacent grooves in proximity to the inner diameter;
    wherein the front surface is curved such that a thickness of the thrust washer is greater at the inner diameter than at the outer diameter.

2. The thrust washer of claim 1, wherein the grooves are spaced evenly along the front surface of the thrust washer.

3. The thrust washer of claim 1, wherein the width of the grooves are greater at the outer diameter than at a point proximal to the inner diameter.

4. The thrust washer of claim 1, wherein the first side of the grooves are curved along at least part of a length thereof.

5. The thrust washer of claim 4, wherein the second side of the grooves are curved along at least part of a length thereof.

6. The thrust washer of claim 1, wherein the grooves extend from the outer diameter to the inner diameter.

7. A torque converter comprising:
    a cover;
    an impeller attached to the cover, the impeller having a plurality of impeller blades, each impeller blade having a front surface and a rear surface;
    a turbine between the impeller and the cover, the turbine having a plurality of turbine blades, each turbine blade having a front surface and a rear surface;
    a stator between the impeller and the turbine; and
    a thrust washer between the cover and the impeller, the thrust washer comprising:
        an annular body having a front surface, an inner diameter, and an outer diameter;
        a plurality of grooves arranged radially along the front surface and extending from the outer diameter towards the inner diameter, the grooves having a first side, a second side opposite the first side, and a width; and
        a plurality of protrusions extending outward from the front surface and located between adjacent grooves in proximity to the inner diameter;
        wherein the front surface is curved such that a thickness of the thrust washer is greater at the inner diameter than at the outer diameter.

8. The torque converter of claim 7, wherein the grooves of the thrust washer are spaced evenly along the front surface of the thrust washer.

9. The torque converter of claim 7, wherein the width of the grooves of the thrust washer are greater at the outer diameter than at a point proximal to the inner diameter.

10. The torque converter of claim 7, wherein the first side of the grooves of the thrust washer are curved along at least part of a length thereof.

11. The torque converter of claim 10, wherein the second side of the grooves of the thrust washer are curved along at least part of a length thereof.

12. The torque converter of claim 7, wherein the grooves of the thrust washer extend from the outer diameter to the inner diameter.

13. The torque converter of claim 7, wherein the impeller blade includes a non-ruled surface.

14. The torque converter of claim 7, wherein the turbine blade includes a non-ruled surface.

* * * * *